United States Patent
Flanders et al.

(10) Patent No.: US 6,172,980 B1
(45) Date of Patent: Jan. 9, 2001

(54) MULTIPLE PROTOCOL SUPPORT

(75) Inventors: John A. Flanders, Ashland, MA (US); Ryan T. Ross, Londonderry, NH (US); William D. Townsend, Groton, MA (US); Thomas A. Lamaire, Acton, MA (US); Thomas V. Radogna, Westborough, MA (US); Brian W. Bailey, Lunenburg, MA (US); Marc D. Sousa, Arlington, MA (US)

(73) Assignee: 3Com Corporation, Santa Clara, CA (US)

( * ) Notice: Under 35 U.S.C. 154(b), the term of this patent shall be extended for 0 days.

(21) Appl. No.: 08/927,913

(22) Filed: Sep. 11, 1997

(51) Int. Cl.[7] .................................................. H04L 12/56
(52) U.S. Cl. ......................... 370/401; 370/351; 370/389; 370/392
(58) Field of Search .................................. 370/401, 402, 370/351, 389, 392

(56) References Cited

U.S. PATENT DOCUMENTS

| | | | |
|---|---|---|---|
| 5,214,646 | * 5/1993 | Yacoby | 370/85.14 |
| 5,371,852 | * 12/1994 | Attanasio et al. | 395/200 |
| 5,428,615 | * 6/1995 | Backes et al. | 370/85.13 |
| 5,917,821 | * 6/1999 | Gobuyan et al. | 370/392 |
| 5,920,566 | * 7/1999 | Hendel et al. | 370/401 |
| 5,940,596 | * 8/1999 | Rajan et al. | 395/200.72 |
| 5,963,556 | * 10/1999 | Varghese et al. | 370/401 |
| 6,014,380 | * 1/2000 | Hendel et al. | 370/392 |

* cited by examiner

Primary Examiner—Huy D. Vu
Assistant Examiner—Dung Trinh
(74) Attorney, Agent, or Firm—Weingarten, Schurgin, Gagnebin & Hayes LLP

(57) ABSTRACT

A network bridge/router for identifying a data unit to be routed by a network bridge/router, for identifying a protocol associated with the received data unit to be routed, and for carrying out appropriate data unit transfer operations, all in hardware. A Receive Header Processor (RHP) analyzes the destination address of the received data unit, in hardware, for determining if routing or bridging is required. If routing is required, the RHP uses portions of the received data unit header as a compare value against predefined values stored in data structures which provide a protocol ID identifying the protocol of the received data unit and serving as an index to the appropriate microcode handling routine, executed by the RHP, for the data unit. The handling routine causes the RHP to forward data unit identifying information appropriate to the identified protocol and obtained from the received data unit to further hardware-based data unit processing elements. These further data unit processing elements are adaptable to the received data unit cast state (e.g. unicast, multicast, broadcast), bridging and/or routing requirements, and received data unit protocol.

11 Claims, 12 Drawing Sheets

ETHERNET VERSION 2 ENCAPSULATION 802.3

802.3 W/SNAP

IPX RAW

| Name | Bits | Description |
|---|---|---|
| MAC DA | Bits 0 - 31<br>Bits 0 - 15 | Original MAC DA. For unicast routed frames, the original MAC DA is overwritten by the new MAC DA. The RFP must save original MAC DA in the control area of the first segment for roving RMON cases. |
| MAC SA | Bits 16 - 31<br>Bits 0 - 31 | The MAC SA is used by the RFP (along with MAC DA) to calculate MAC DA/SA pair hash index (2 byte CRC) for RMON applications. |
| RCF | Bit 3 | Route Cache Flag Bit. This bit is set when the RHP determines a routing case (as opposed to bridging). This flag is used as an indicator of ACA bridge or route cache used. |
| Protocol Index | Bits 4 - 7 | RHP obtained protocol index. The protocol index is stored in Protocol and LLC Tables. |
| Receive Port | Bits 8 - 15 | Virtual port on which the frame is received. |
| VLAN ID | Bits 16 - 23 | VLAN ID from the VLAN Mapping table. |
| CoS ID | Bits 8 - 15 | CoS ID calculated by the RHP. Either taken from the frame (802.1q tag), or PACE mapped into CoS, or null CoS value. |
| Sequence Number | Bits 0 - 7 | Frame sequence number. Used for synchronization between the RHP, RFP and the ASA. |
| RCV DL Encapsulation | Bits 27 - 31 | Inbound Data Link Encapsulation as determined by the RHP. |
| RHP Data | Bits 0 - 7<br>Bits 16 - 31 | Protocol dependent data. For IP v.4, the TTL value is placed in the RHP Data field. For IP v.4 IP datagram length is placed in the last word. |
| RHP Status Word | Bits 8 - 15 | The RHP Status Word defines results of RHP microcode processing. The RHP stores bit encoded information that is to be used by the RFP in forwarding a frame (see Figure 5). |
| RHP Exception Status | Bits 16 - 31 | The RHP Exception Status defines results of RHP microcode processing. The RHP stores encoded exception information in this field. The RFP does not handle the frame forwarding when this field is set by the RHP and the frame is passed to the FP. The field is different for bridging and routing (see Figure 6). |
| PDD VLAN Tag | Bits 0 - 31 | PDD VLAN tag is passed to the RFP here. |

*FIG. 5*

| Value | Name | Description |
|---|---|---|
| 0x80 | Our MAC DA Bit | This bit is set when unicast MAC DA is in the RHP MAC Address table. |
| 0x40 | IP v4 Multicast MAC DA Bit | This bit is set when the MAC destination address is IP v4 multicast. |
| 0x20 | TCP/IP Bit | This bit is set when the frame is TCP/IP. |
| 0x10 | Flow Frame Bit | This bit is set when the frame must be looked up by the flow information. Valid only for unicast and multicast bridged or routed frames. |
| 0x08 | Overlap VLAN Bit | Set when the source VLAN is a logical union of overlapped IP VLANs (from VLAN Mapping Table). |
| 0x04 | VLAN Tag Bit | Set when IEEE VLAN tag is present in the frame. |
| 0x02 | CoS Tag Bit | Set when IEEE CoS tag is present in the frame. |
| 0x01 | Reserved Bit | |

*FIG. 6*

| Bits | Bridging | IP v4 Routing | IP v6 Routing | IPX Routing | AT Routing |
|---|---|---|---|---|---|
| 16 | Exception Bit (1) | Exception Bit (1) | Exception Bit (1) | Exception Bit (1) | Exception Bit (1) |
| 17 | VLAN Search | VLAN Search | | | |
| 18 | Source Routing | IP Header Options | | | |
| 19 | Non LLC Frame | IP Header Errors | | | |
| 20 | Reserved | IP Checksum Error | | | |
| 21 | Reserved | IP Version Error | | | |
| 22 | Reserved | IP TTL Error | | | |
| 23 | Reserved | IP SA Error | | | |
| 24-31 | Reserved | Reserved | | | |

*FIG. 7*

RHP to ACA Interface

| Word Number Field Size (bits) | Field Description |
|---|---|
| 1/2 | Receive Physical Queue: must be 1, 2 or 3 |
| 1/1 | Our MAC DA Flag: when set, MAC DA is within low/high range. |
| 1/1 | Route Cache Selector Flag: when set, ACA must perform lookup in the Route Cache |
| 1/4 | Protocol Index: determined by the RHP. |
| 1/8 | DA Length: Destination address length. The following are the values:<br>Bridge: 1 byte reserved + 1 byte RHP VLAN ID + MAC DA 6 bytes - 8 bytes total;<br>IP v4: IP DA: 4 bytes;<br>IP v4 multicast: IP DA: 4 bytes and IP SA: 4 bytes - 8 bytes total;<br>IP Flow lookup: IP DA /SA - 4 bytes each, UDP/TCP src/dst ports 2 bytes each, IP Protocol type - 1 byte - 13 bytes total;<br>IP v6: IP v6 DA: 16 bytes and IP v6 group: 4 bytes<br>IPX: IPX DA: 10 bytes<br>Appletalk: Appletalk DA: 3 bytes |
| 1/8 | Virtual receive port: Used by the ACA to set Source Address equal bit (and port equal bit) and Destination Address equal bit (and port equal bit) |
| 1/8 | Frame sequenece number: Supplied for synchronization only, and not used by the ACA. |
| 2/8 | Hardware reserved |
| 2/8 | Frame Control: For FDDI ports RHP puts FC in the field |
| 2/16 | LEC ID: For ATM ports, LEC ID is placed in the field |
| 3/8 | Hardware reserved |
| 3/8 | RHP VLAN ID: VLAN ID is placed in the field as determined by RHP. VLAN ID field either set to 0 (Single bridge model) or RHP sets it up to VLAN from the VLAN Mapping table (Multiple bridge model). The ACA always performs lookup on the MAC SA for bridge learning. |
| 3/16 | MAC SA Address (high order 2 bytes): MAC source address |
| 4/32 | MAC SA Address (low order 4 bytes): MAC source address |
| 5-9/ variable | Variable Length DA: Defines one of the following:<br>Bridge: 1 byte reserved + 1 byte RHP VLAN ID + MAC DA 6 bytes - 8 bytes total;<br>IP v4: IP DA: 4 bytes;<br>IP v4 multicast: IP SA: 4 bytes and IP DA: 4 bytes - 8 bytes total<br>IP v4 Flow info: IP SA /DA - 4 bytes each, IP Protocol type - 1 byte, UDP/TCP src/dst ports - 2 bytes each, 13 bytes total;<br>IP v6: IP v6 DA: 16 bytes<br>IP v6 multicast: IP v6 DA: 16 bytes and IP v6 SA: 16 bytes<br>IPX: IPX DA: 10 bytes<br>Appletalk: Appletalk DA: 3 bytes |

*FIG. 8*

RHP Protocol Table / RHP LLC Table

| | Output | | | | Input |
|---|---|---|---|---|---|
| | MSB | | | | LSB |
| | 0   3 | 4   7 | 8   11 | 12   15 | 16   31 |
| | Res. | Proto Index | Res. | Proto VLAN | Protocol Type/LLC-DSAP:SSAP |
| 0 | | | | | |
| 1 | | | | | |
| 2 | | | | | |
| 3 | | | | | |
| 4 | | | | | |
| 5 | | | | | |
| 6 | | | | | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | Default - protocol not recognized |

32 bits * 16 entries = 512 bits

FIG. 9

RHP VLAN Mapping Table

| | Output | | | Input | |
|---|---|---|---|---|---|
| | MSB | | | | LSB |
| | 0   7 | 8 | 9   10 | 11   14 | 15   31 |
| | VLAN ID | UV | Port | Proto VLAN | VLAN Tag (*17 bits) |
| 0 | | | | | |
| 1 | | | | | |
| 2 | | | | | |
| 3 | | | | | |
| ⋮ | | | | | |
| 126 | | | | | |
| 127 | | | | | |

32 bits * 128 entries = 4096 bits

FIG. 10

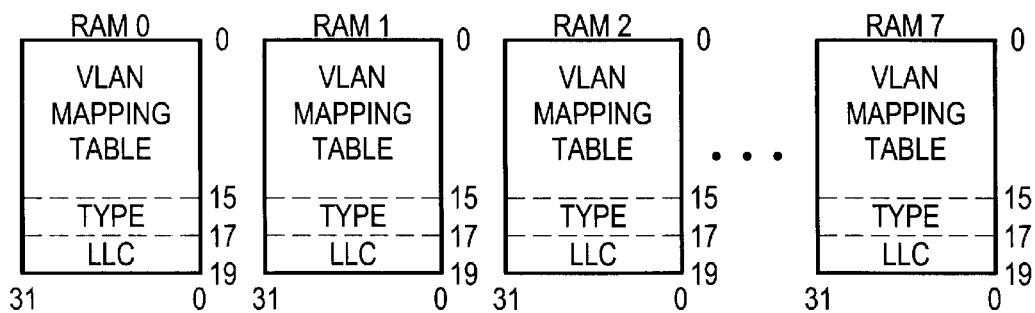

ACA to RHP and RFP data

| Bridged Frame | |
|---|---|
| Unicast | Multicast |
| Protocol ID | Protocol ID |
| Frame control | Frame control |
| DA VC handle | DA VC handle |
| | |
| SA search status | SA search status |
| SA address state | SA address state |
| DA search status | DA search status |
| DA address state | DA address state |
| | |
| Unused | Unused |
| Unused | Unused |
| | |
| Unused | Unused |
| RHP vlan ID | RHP vlan ID |
| Unused | Unused |
| | |
| Transmit virtual port | Transmit virtual port |
| LBPG mask | LBPG mask |
| | |
| DA adr group mask (31-24) | Reserved |
| DA adr group mask (23-0) | DA vport mask |
| | |
| DA adr group mask (31-0) | DA adr group mask (31-0) |
| | |
| DA learned port | Puma multicast mask |
| Discard bit, TX encap | Reserved |
| Receive virtual port | Receive virtual port |
| Sequence number | Sequence number |
| | |
| SA software tag | SA software tag |
| DA software tag | DA software tag |
| | |
| | |
| Unused (12 bits) | Unused (12 bits) |

ACA to RHP and RFP data

| Routed Frame | |
|---|---|
| Unicast | Multicast |
| Protocol ID | Protocol ID |
| Frame control | Frame control |
| DA VC handle | DA VC handle |
| | |
| SA search status | SA search status |
| SA address state | SA address state |
| DA search status | DA search status |
| DA address state | DA address state |
| | |
| DA(47-24) | Parent port mask |
| DA(23-16) | Forward port mask(23-16) |
| | |
| DA(15-0) | Forward port mask(15-0) |
| RHP vlan ID | RHP vlan ID |
| ACA vlan ID | ACA vlan ID |
| | |
| Transmit virtual port | Transmit virtual port |
| LBPG mask | LBPG mask |
| | |
| QOS(39-32) | QOS(39-32) |
| QOS(31-8) | QOS(31-8) |
| | |
| DA adr group mask (31-0) | DA adr group mask (31-0) |
| | |
| DA learned port | Puma multicast mask |
| Discard bit, TX encap | Reserved |
| QOS(7-0) | QOS(7-0) |
| Sequence number | Sequence number |
| | |
| SA software tag | SA software tag |
| DA software tag | DA software tag |
| | |
| Unused (12 bits) | Unused (12 bits) |

*FIG. 12B*

| Bit Position | Field Description |
|---|---|
| 0 | Address Hit Bit. When this bit is set the ACA found an address in its address cache. For DA when the bit is reset, the frame must be processed by the FP software in order to a) handle unknown destination address frame; b) install destination address into ACA cache. For SA when the bit is reset, the frame must be processed by the FP software in order to a) learn unknown SA; b) install destination address into the ACA cache. |
| 1 | Port Group Equal Bit. Same as Port Equal Bit but applies to a group of ports as oppose to a single port. This is used when LAN Trunking is configured. |
| 2 | Port Bit Equal. This bit is set when the frame is received on the same port as configured in the ACA for this address. For MAC SA this is used for detecting MAC address movements. For DA in bridge case it is used to implement local bridge filtering function. For DA in route case, it is used to detect ICMP redirect cases. |
| 3 | Incomplete Search Bit. This bit is set when the ACA did not have enough time to search for address in it's cache. When this bit is set, the frame must be processsed by the FP software. |
| 4 | Software Override Bit. When this bit is set, the frame must be passed to the FP. No hardware forwarding of this frame is performed. Not used by the RFP. |
| 5 | Reserved |
| 6 | Broadcast bit. Not used by the RFP. |
| 7 | Multicast bit. Not used by the RFP. |

*FIG. 12C*

| Bit Position | Field Description |
|---|---|
| 0 | ACA Multicast entry indicator. Not used by RFP. |
| 1 | CRC required bit. Provided to support LLC based encapsulation for bridged traffic on ATM interfaces. Currently not used, and provided for future expansion. |
| 2 | Transmit Loss Flag. This bit effects frame loss ratio. |
| 3-4 | Transmit Queue Priority. This selects one of the possible 4 transmit priority queues. This bit effects frame transfer delay. |
| 5 | Internal Address Flag. When this bit is set, the frame must be passed to the FP software for further processing. |
| 6-7 | ACA Entry Notification Indication. Generates 1 of 3 possible monitoring vectors. Type 1 and 3 do not have buffer. Type 2 also contains buffer. |

*FIG. 12D*

| Bit Position | Field Description |
|---|---|
| 0 | QoS enable. Indicates if the entry contains valid QoS information. |
| 1 | RSVP flow. When set, indicates a RSVP flow. |
| 2-3 | Excess action. Valid if QoS enable is set. |
| 4 | Excess monitor flag. When set, RFP generates type 1 monitor vector for excess frame. Valid if QoS enable is set. |
| 5 | Excess loss flag. This bit effects frame loss ratio. Valid if QoS enable is set. |
| 6-7 | Excess Transmit Priority. This selects one of the possible 4 transmit priority queues. This bit effects frame transfer delay. Valid QoS enable is set. |

*FIG. 12E*

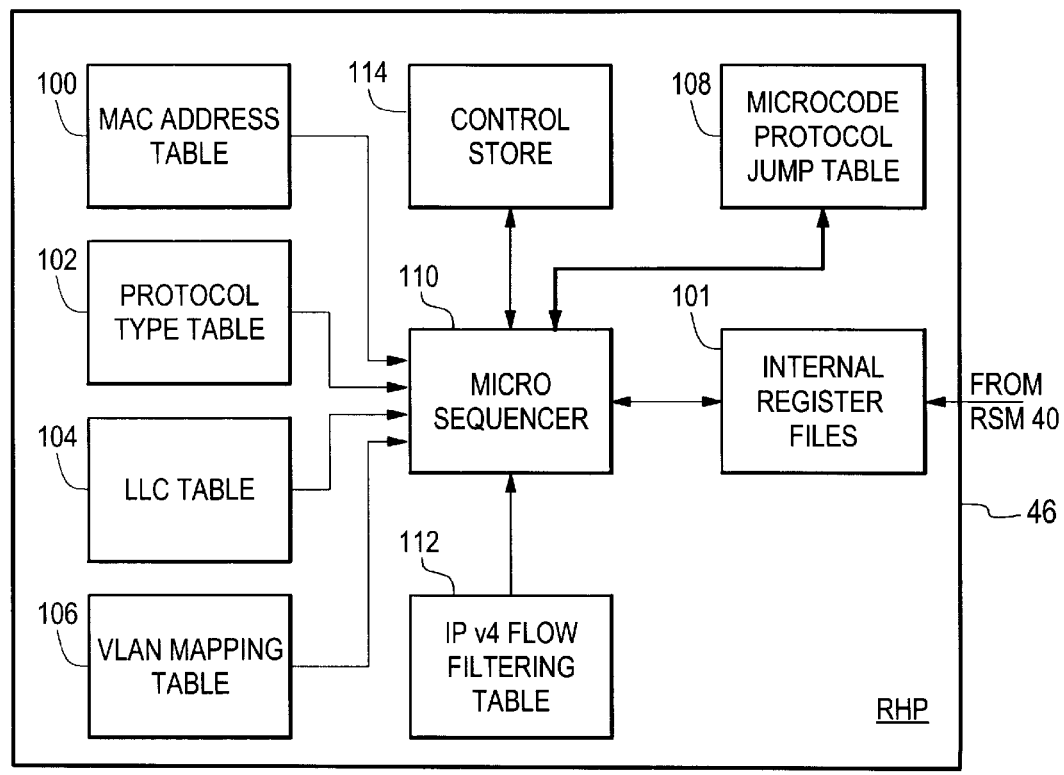

*FIG. 13*

MULTIPLE PROTOCOL SUPPORT

RELATED APPLICATIONS

Not Applicable

STATEMENT REGARDING FEDERALLY SPONSORED RESEARCH

Not Applicable

BACKGROUND OF THE INVENTION

Machines, such as computers, switches and routers communicate to each other through established conventions known as protocols. These protocols define a set of procedural rules for information exchange over a communication medium, the rules governing the content, format, timing, sequencing, and error control of messages exchanged in a network.

Prior art network devices such as routers have supported the routing of data units of differing protocols through the identification of the applicable protocol and carrying out the necessary data unit processing in software. Such data unit processing includes reencapsulation of data units and providing the appropriate routing of the data unit through the network device.

Typical data unit transfer rates require present day switches and routers to process 4,000,000 data units per second. Software routing, as provided by routers of the prior art, are incapable of processing incoming data units at such rates without significant data loss or throttling of upstream network elements. Data loss necessitates time intensive and bandwidth consuming retransmission, while throttling requires complex flow control mechanisms and costly buffering capacity in the source network element, in the router, or both.

SUMMARY OF THE INVENTION

The present invention provides a network bridge/router for identifying received data units which may require routing, for identifying a protocol associated with the received data unit, for determining whether the received data unit is in fact to be bridged or routed, and for carrying out appropriate data unit transfer operations, all in hardware. Such hardware processing enables the presently disclosed network bridge/router to operate at the maximum rate at which data units are received, known as the wire speed.

Major elements of the presently disclosed network bridge/router which enable these functions include a Receive Header Processor (RHP), an Address Cache ASIC (ACA), a Receive Frame Processor (RFP), and a Transmit Header Processor (THP). The RHP analyzes the destination address of the received data unit, in hardware, for determining if routing or bridging is required. If routing is required, the RHP uses portions of the received data unit header as an index into associated data structures. These data structures provide a protocol ID as an index to the appropriate microcode handling routine, executed by the RHP, for the data unit. The handling routine causes the RHP to forward data unit identifying information, including source and destination addresses and protocol ID, from the received data unit to the ACA.

The ACA utilizes the received data unit information from the RHP in looking up entries in an Address Cache. The ACA then provides data to the RHP and RFP reflecting a new layer-2 destination address, protocol ID, Address Cache lookup status, destination address masks, and other information. The RHP overwrites the layer-2 destination address with the new address, and forwards the data unit to a Receive Segment Unit (RSEG) for storage in buffers.

The RFP takes the information from the ACA, address, VLAN, status and other information from the RHP, and data from other sources in creating code vectors which determine whether the received data unit is to be forwarded entirely by the network bridge/router hardware, or if the assistance of software run by a Frame Processor is necessary. If handled in hardware, information appropriate for further data unit processing is passed to the THP.

If the data unit is to be bridged the THP performs any necessary layer-2 header translations. If the data unit is to be routed the THP performs further layer-2 and layer-3 header processing using a microcode routine indexed by the protocol ID for this data unit. A new layer-2 source address is generated by the THP prior to reassembling the data unit and transmitting it from the network bridge/router.

BRIEF DESCRIPTION OF THE DRAWINGS

The invention will be more fully understood by reference to the following Detailed Description of the Invention in conjunction with the drawings of which:

FIG. 5 further defines the RHP to RFP interface of FIG. 4;

FIG. 6 illustrates an RHP to RFP status word;

FIG. 7 illustrates an RHP to RFP exception status word;

FIG. 8 illustrates an RHP to Address Cache ASIC (ACA) interface;

FIG. 9 illustrates an RHP Protocol Type Table/RHP LLC Table;

FIG. 10 illustrates an RHP VLAN Mapping Table;

FIG. 11 illustrates a physical distribution of the VLAN Mapping Table, Protocol Type Table (TYPE), and the LLC Table (LLC) across eight RAMs associated with the RHP;

FIGS. 12A and 12B illustrate ACA to RHP and RFP interfaces;

FIG. 12C defines an ACA to RHP and RFP search status word;

FIG. 12D defines an ACA to RFP entry state word;

FIG. 12E defines an ACA to RFP Quality of Service (QoS) state word; and

FIG. 13 is a block diagram of an RHP according to the present invention showing related data structures and hardware.

DETAILED DESCRIPTION OF THE INVENTION

Figure 1:
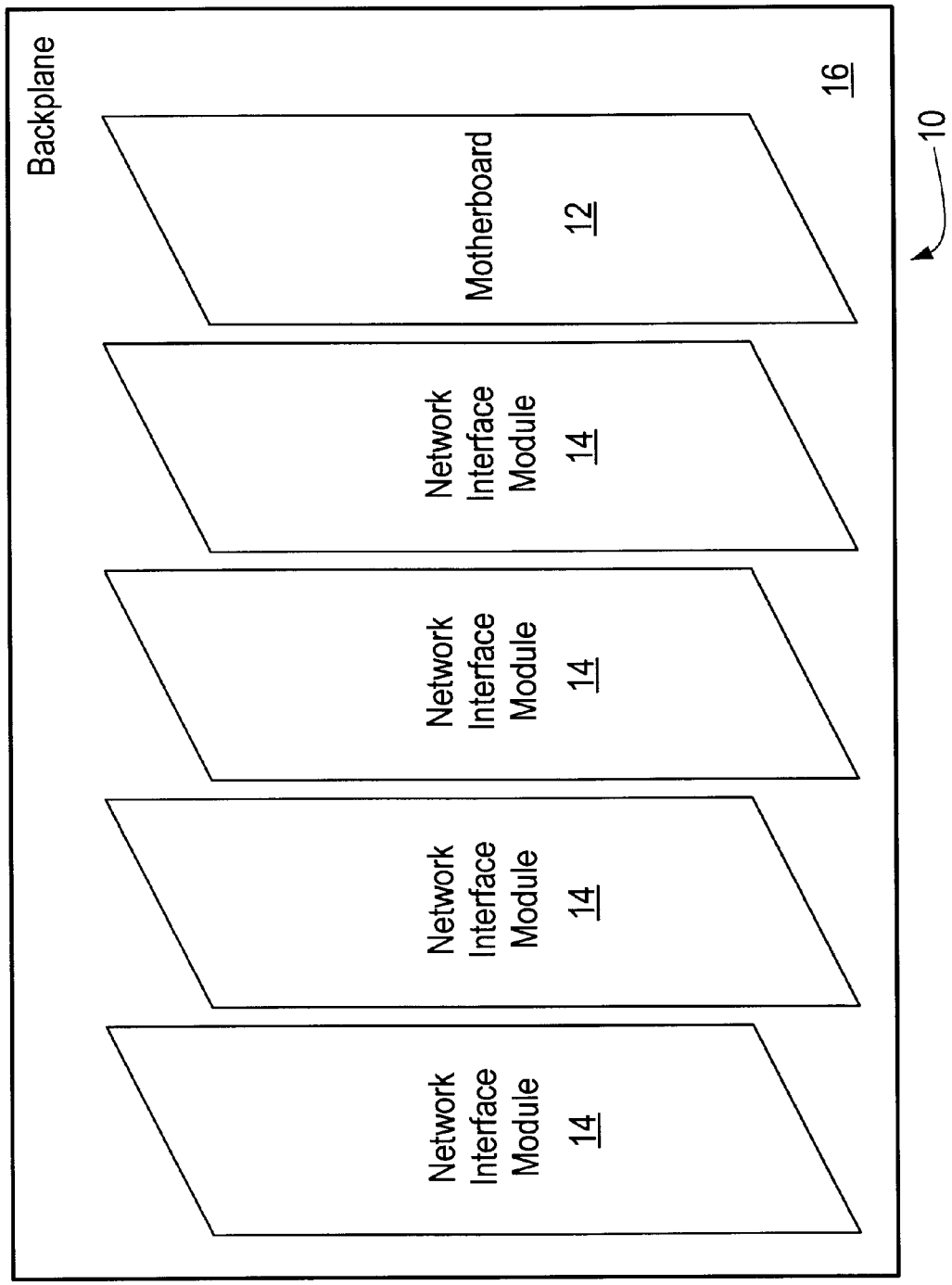
FIG. 1 is pictorial diagram of a network device in accordance with the present invention illustrating Network Interface Modules and a Motherboard mounted on a backplane.
Figure 2:
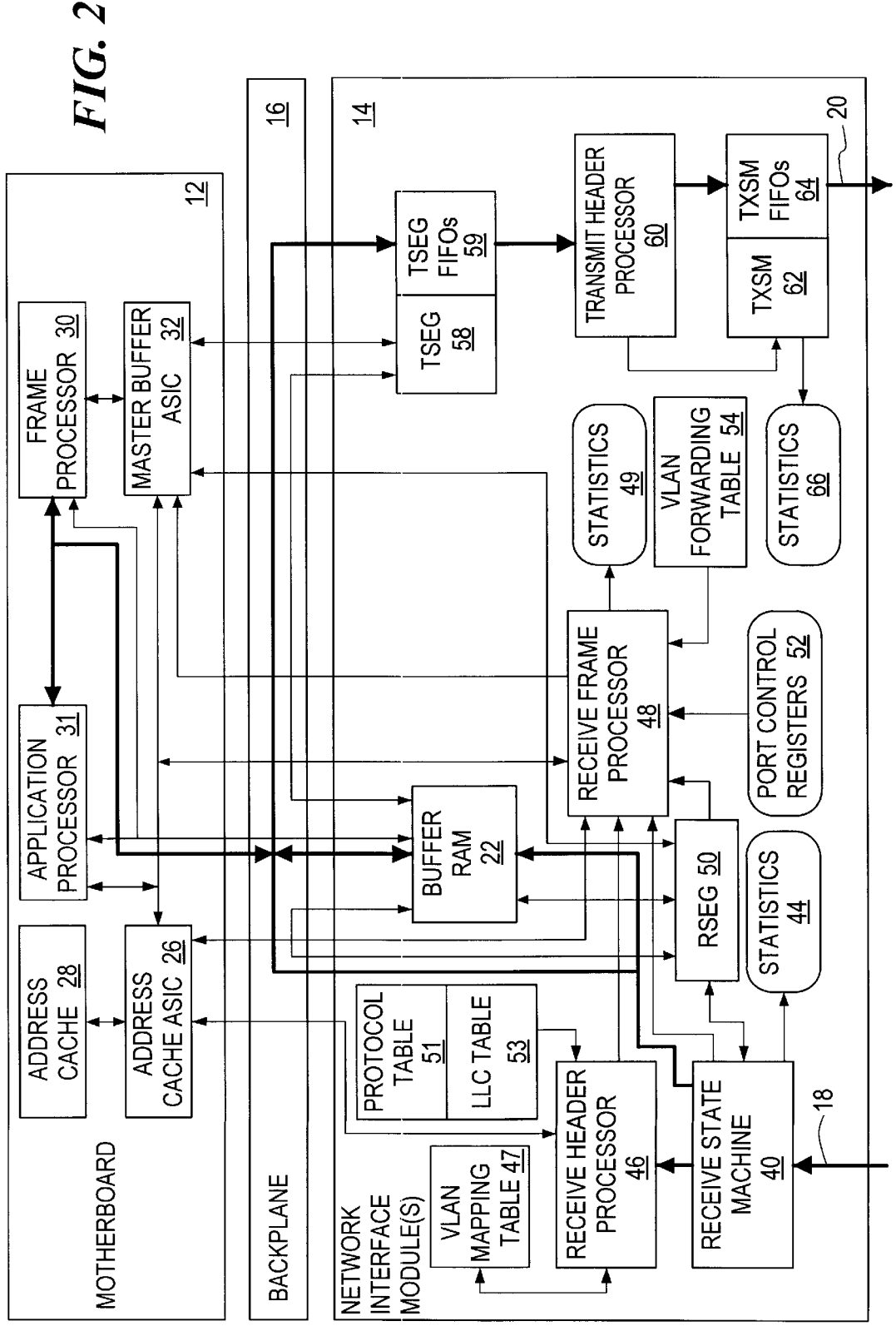
FIG. 2 is a block diagram of a network device in accordance with the present invention illustrating one Network Interface Module coupled to the Motherboard via a backplane.

Referring to FIGS. 1 and 2, a bridge/router network device 10 for use in a telecommunications network includes a motherboard 12 and at least one network interface module 14. Each of the network interface modules 14 interfaces to the motherboard 12 through a backplane 16.

Each network interface module 14 includes at least one input port 18 through which data units such as frames, packets and cells are received and at least one output port 20 through which data units are forwarded downstream for receipt by another network device. In particular, the ports provide connections via communication links to other devices in the network. Incoming data units may be bridged, translationally bridged, routed, translationally routed or filtered.

In one embodiment of the presently disclosed network device 10, four slots are provided for network interface modules 14. Each slot may be populated with an Ethernet, FDDI or an ATM UNI interface module. In a preferred embodiment, each 10/100 megabit Ethernet network interface module 14 includes six input/output ports, each FDDI network interface module 14 includes six input/output ports, and each gigabit Ethernet network interface module 14 includes one input/output port. An ATM network interface module 14 includes two OC3 input/output ports or one OC12 input/output port.

Elements in the motherboard 12 and interface modules 14 are responsible for data unit reception and transmission, parsing of data link and network layer headers within received frames, look-up of source and destination Media Access Control ("MAC") and network layer addresses and for making forwarding decisions regarding the received frames.

The motherboard 12 includes an address cache ASIC ("ACA") 26 with an associated cache 28, a Frame Processor (FP) 30, an Application Processor 31 and a Master Buffer ASIC ("MBA") 32.

The ACA 26 serves to perform look-ups on destination and source addresses passed to the ACA from a Receive Header Processor ("RHP") within the respective network interface modules 14. The ACA 26 is capable of looking up MAC addresses for bridging support and Network Layer destination addresses for routing support.

The MBA 32 located on the motherboard 12 serves to provide global data buffer management of frames which reside in buffers in Buffer RAM 22 disposed on respective Network Interface Modules 14. Each network interface module 14 includes a receive ASIC and a transmit ASIC, both of which are specific to the type of data traffic supported by the respective network interface module (such as Ethernet, ATM and FDDI).

Each receive ASIC includes a Receive State Machine ("RSM") 40, for receiving frames at respective ports 18 of the respective network interface module 14, a Receive Header Processor ("RHPF") 46 for parsing headers of received frames, Buffer RAM 22 for storing received frames, a Receive Segment Processor (RSEG) 50 for dividing the received frame into segments and moving frame segments to appropriate locations within Buffer RAM 22, and a Receive Frame Processor ("RFP") 48 for making forwarding decisions regarding received frames.

The RHP 46 within the receive ASIC functions to parse incoming data units to obtain the MAC source address, the MAC destination address and network layer addresses. Additionally, the RHP 46 determines the VLAN that the frame was received on, if any, and determines if the received data unit is a candidate for routing. If the received data unit is a candidate for routing, the RHP determines the protocol being used for the received data unit. Such information is forwarded to the ACA control logic 26 to generate an index into the ACA cache 28. The ACA cache 28 operates under the control of ACA control logic 26 to obtain forwarding information relative to the received data unit. Cache lookups are performed in the ACA cache 28 based upon indices generated within the ACA control logic 26. In the event of a miss on one of the cache lookups, the RFP forwards a first type of vector to the Frame Processor 30 for further software processing of the data unit. In the event of hits on the relevant addresses, a second type of vector is forwarded to the Master Buffer ASIC (MBA) and forwarding through the router/bridge proceeds at high speed via dedicated hardware logic.

More specifically each network interface module 14 includes a Receive State Machine ("RSM") 40. Different versions of the RSM 40 are provided for the different network interface module 14 types, i.e. Ethernet, FDDI and ATM. The RSM 40 is responsible for receiving data units from the respective input ports 18 of the network interface module 14. After receiving a data unit, the RSM 40 generates data unit status information regarding received frames which is stored in registers 44 and forwarded to the RFP 48. The status information includes error information, receive byte counts and receive frame counts on a per port basis.

The RHP 46 is responsible for identifying data units to be bridged or routed, determining inbound data unit encapsulation type, determining the VLAN identification of the received frame, if any, and performing protocol specific processing for routed data units. Different versions of RHPs 46 are provided for different network interface types, i.e. Ethernet, FDDI and ATM. The RHP 46 is implemented primarily as a hardware microsequencer which is loaded with microcode by the frame processor 30, though any form of microcontroller or state machine in general can be used in alternative embodiments.

The RHP 46 is provided with a microsequencer 110, a control store 114, and internal register files 101 (FIG. 13). The RHP 46 buffers up to the first 84 bytes of the incoming frame, or less for smaller frames, in the internal register files 101 for frame processing. Up to 512 bytes per port can be buffered in these internal register files 101. Frames are processed sequentially in the RHP 46, not in parallel. The layer-2 and layer-3 portions of the header of the received data unit are examined in the register files 101 to determine whether the data unit is unicast or non-unicast. This is done by examining a bit in the MAC Destination Address (DA) of the received data unit.

All RHP 46 analysis of the received data unit header discussed subsequently is carried out by the RHP microsequencer 110, accessing the control store 114, while the data unit header is stored in the internal register files 101.

To determine routing versus bridging, the RHP 46 utilizes an RHP MAC Address Table 100 containing the upper three bytes of the Organization Unique Identifier (OUI) for the network bridge/router, as well as two values which represent upper and lower bounds for the lower three bytes of the network bridge/router MAC Addresses. The RHP 46 compares the upper three bytes of the six byte MAC DA from the received frame against the upper three bytes of the OUI of the network bridge/router, stored in the MAC Address Table 100 (FIG. 13). If the two address segments do not match, the frame may be bridged, but not routed, by the network bridge/router. The VLAN type and protocol type are determined as below.

If the upper three bytes of the received MAC DA match the predefined OUI, then the lower three bytes of the MAC DA are compared against the range of values stored in the RHP MAC Address Table 100. If not within the range, the frame may be bridged, but not routed, by the network bridge/router. If the received MAC DA is within the address range of the RHP 46, this is an indication that the frame is directed to one of the predefined addresses of the network bridge/router and therefore is assumed to be routed by the RHP 46. A Route Cache Flag and Our MAC DA Flag in the RHP Status Word (FIG. 6) are set. The VLAN type and protocol type are determined as follows whether or not the received MAC DA matched one of the pre-definedbridge/router MAC addresses.

Figure 3A:
FIGS. 3A through 3D illustrate portions of headers for four received frame formats.
Figure 3B:
Figure 3C:
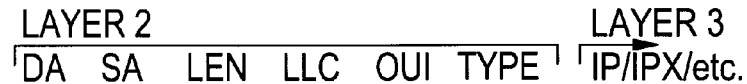
Figure 3D:

With regard to FIGS. 3A, 3B, 3C, and 3D, ethernet frames are received in one of a number of different formats. FIGS. 3A and 3B are examples of IEEE Standard 802.3 (802.3) without SNAP (SubNetwork Access Protocol) formats. FIG. 3C is an example of an 802.3 with SNAP format. FIG. 3D is an example of an IPX format, a proprietary format of Novell, Inc. To determine the inbound encapsulation, the Receive Header Processor 46 examines a field in a frame header following the MAC Source Address (SA) for each format to determine if that field represents a length (LEN) field or a type (TYPE) field. A value of less than or equal to 1500 decimal (5DC hexadecimal) in the LEN or TYPE location indicates a LEN field, while a value of greater than 1500 in the LEN or TYPE location indicates a TYPE field.

In FIG. 3A, the field following the MAC SA is greater than 1500 decimal, and so is regarded as a TYPE field. The received frame will only be considered EtherType and a candidate for routing if the TYPE field contains the value 0800× for IP v4 or 8137× for IPX (the lower case "x" indicating hexadecimal).

In FIG. 3B, the field following the MAC SA is less than or equal to 1500 decimal and so is regarded as a LEN field. The next sequential data field is regarded as a Logical Link Control (LLC) field. The LLC field is comprised of a Destination Service Access Point (DSAP), a Source Service Access Point (SSAP), and a control byte.

FIG. 3C is a special case of FIG. 3B and includes a SNAP header. The field following the MAC SA is less than or equal to 1500 decimal and so is identified as a LEN field, followed by an LLC field. However, in the SNAP header case, the DSAP, SSAP and control byte entries making up the LLC field collectively have the value of AAAA03x. In this special case, the next three bytes following the LLC field are an OUI which must be equal to zero for the frame to be EtherType, and the two bytes after that are a TYPE field. If OUI does not equal zero, the received frame is not a candidate for routing; though the Protocol Type Table lookup is still performed, the received frame is only a candidate for bridging.

In FIG. 3D, the field following the MAC SA is again less than or equal to 1500 decimal, so this is regarded as a LEN field. In the IPX case, the field following the LEN field is referred to as an IPX field and has a value of FFFFx. In 802.3 format, the IPX field is in the same location as the LLC field; the network bridge/router as presently disclosed treats this field as an LLC value for purposes of protocol identification.

Once a value of TYPE or LLC has been extracted from the header of the received frame, a Protocol Type Table 102 or an LLC Table 104 associated with the RHP 46 (both shown in FIGS. 9 and 13) is employed to identify a protocol ID and VLAN ID of the received frame. For the formats of FIGS. 3A and 3C, the data value from the TYPE field is used as a compare value against predefined values programmed into the Protocol Type Table (also referred to simply as the Protocol Table or the Type Table). For the format of FIG. 3B, the data value from the first two bytes of the LLC field is used as a compare value against predefined values programmed into the LLC Table. For the format of FIG. 3D, the first two bytes of the IPX header, the IPX header checksum field, is used as a compare value against predefined values programmed into the LLC table.

The Protocol and LLC Tables (102, 104) each have sixteen entries, as in FIG. 9, initialized by the FP 30. Each entry consists of a two byte protocol type, four bit protocol index, four bit protocol VLAN index, and reserved bits. In a preferred embodiment of the present invention, each of these tables includes two entries indicative of a routing protocol (IP and IPX, respectively), thirteen reflecting a frame to be bridged, and one entry being a default entry and also reflecting a frame to be bridged. Alternative embodiments of the present invention support as many routing protocols as there are entries in each of the Protocol and LLC Tables (102, 104), without limiting these tables to sixteen entries each.

A VLAN Mapping Table 106 (FIGS. 10 and 13) is also associated with the RHP. The primary purpose of the RHP VLAN Mapping Table 106 is to map possibly non-unique VLAN information to a VLAN ID that is unique within the network bridge/router. The RHP 46 uses a VLAN Tag extracted from the header of the received frame, if one exists, along with the physical port number on which the frame was received and the VLAN ID from either the Protocol Type Table 102 or the LLC Table 104. The outputs of the VLAN Mapping Table 106 are a VLAN ID (one of 256 possible numbers used by the bridge/router hardware to uniquely represent a given VLAN) and an Uncertain VLAN bit used to signal the RFP 48 that the resultant VLAN ID is uncertain and cannot be used in calculations requiring an exact receive VLAN identification. The VLAN ID is forwarded to the ACA 26 (see FIG. 8) and RFP 48 (see FIGS. 4 and 5). If the VLAN ID does not match any of the VLAN Mapping Table 106 indices, a VLAN Search Flag is set in the RHP exception word (FIG. 7) to indicate a search failure.

Also associated with the RHP 46 is a Microcode Protocol Jump Table 108 (FIG. 13), stored in a control store 114, containing addresses of protocol-specific processing subroutines to be executed by a microsequencer 110 associated with the RHP 46. The Microcode Protocol Jump Table 108 is created by microcode tools during microcode assembly and linking. The protocol ID, obtained either from the Protocol Type Table 102 or the LLC Table 104, is used to find an address of the protocol specific processing routine in the Microcode Protocol Jump Table 108 to be executed by the RHP 46.

An exemplary IP v4 protocol specific routine includes the following elements. The IP protocol type is extracted from the IP header of the received frame. Then the User Datagram Protocol/Transaction Control Protocol (UDP/TCP) source and destination ports are extracted from the received frame and are searched for in an IP v4 Flow Filtering Table 112 (FIG. 13). The RHP 46 uses flow filters to classify incoming data units as either being flow controlled or best effort. The Flow Filtering Table 112 tells the RHP 46 which packets to look up in the ACA 26 by flow ID, and which to look up in the ACA 26 by MAC DA or IP address. The Flow Filtering Table 112 includes a list of IP protocol types; for packets of those IP protocol types, the RHP 46 looks them up by flow ID. The Flow Filtering Table 112 also includes two ranges for UDP destination port numbers. Unicast UDP packets whose UDP destination port lies outside both ranges are not looked up by flow ID.

Figure 4:
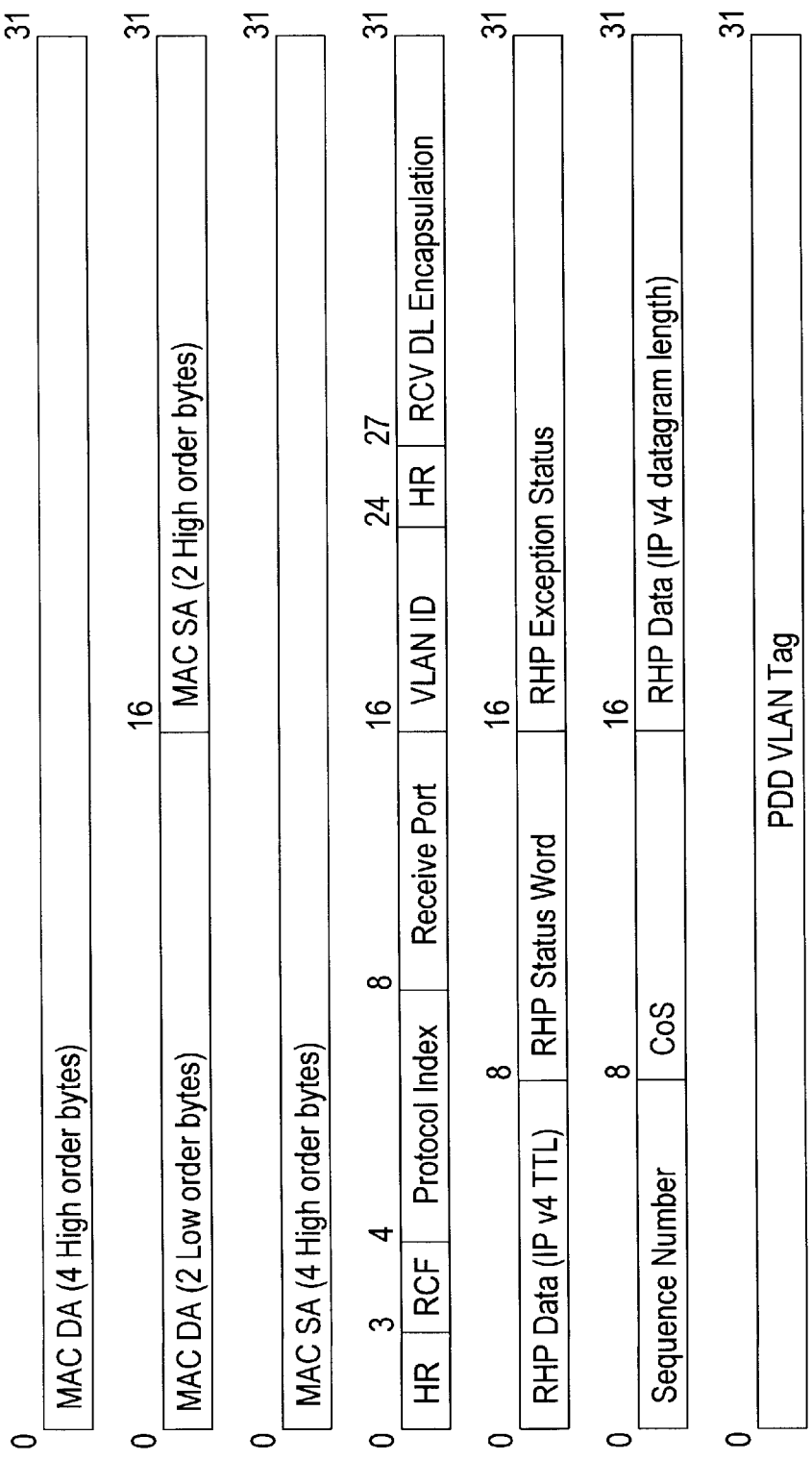
FIG. 4 illustrates a Receive Header Processor (RHP) to Receive Frame Processor (RFP) interface.

Packets to be looked up by flow ID utilize a flow cache associated with the ACA 26, the flow cache containing Quality of Service (QoS) parameters for a flow, a Flow Frame Flag is set in the RHP 46 to RFP 48 status word (FIG. 6), and a Route Cache Flag is set in the RHP 46 to RFP 48 data word (FIGS. 4 and 5).

Packets to be looked up by MAC DA or IP address utilize an address cache 28 associated with the ACA 26. If the IP Multicast Bit is set in the RHP 46 to RFP 48 status word (FIG. 6), per-port configurations are checked in RFP-associated data structures called Port Control Registers (PCRs) for IP multicast routing. If enabled, the Route Cache Flag is set.

The RHP 46 determines whether the received frame is TCP, and if so, sets a TCP/IP Flag in the RHP 46 to RFP 48 status word (FIG. 6).

For a unicast frame having a MAC DA within the predefined address range of the bridge/router from the MAC Address Table 100, the Our MAC DA Flag is set in the RHP 46 to RFP 48 status word (FIG. 6) and IP v4 header processing is performed based upon a jump to the appropriate processing routine from a corresponding entry in the Microcode Protocol Jump Table 108. For a multicast frame, if the Route Cache Flag is set in the RHP 46 to RFP 48 data word (FIGS. 4 and 5), IP v4 header processing is performed based upon a jump to the appropriate processing routine from a corresponding entry in the Microcode Protocol Jump Table 108. In each case, the header processing includes a check of the IP length, version number, IP header checksum, and Time To Live (TTL). Other values are adjusted in the RHP 46 to RFP 48 status and exception words, as appropriate. Also, TTL and IP datagram length information are forwarded to the ACA 26, and relevant IP header information is passed to the ACA 26, depending upon whether the lookup is for a bridge cache, a route cache unicast/multicast, or a flow cache.

In the ACA 26, address and flow caches are searched based primarily upon data received from the RHP 46. A bridge cache lookup is performed when the Routing Flag is reset; the RHP 46 sends the ACA 26 the MAC SA, MAC DA, and Protocol ID to the ACA (FIG. 8). A route cache lookup (unicast or multicast) occurs when the Routing Flag is set and the Flow Lookup Flag is reset; the RHP 46 sends IP DA (unicast routing) or IP DA and SA (IP multicast routing), the MAC SA, and the Protocol ID to the ACA 26 (FIG. 8). A flow cache lookup occurs when the Routing Flag is set and the Flow Lookup Flag is set; the RHP 46 sends the IP DA, IP SA, IP protocol type, UDP/TCP source and destination ports, MAC SA, and Protocol ID to the ACA 26 (FIG. 8). Thus, the frame processing decisions effected in hardware by the RHP 46 result in differing cache lookup procedures in the ACA 26.

The ACA 26 to RHP 46 and RFP 48 interface includes search address and status, protocol ID, VLAN ID, address group mask, and other information according to whether the received data unit is unicast or multicast, and bridged or routed. Exemplary ACA 26 to RHP 46 and RFP 48 data is provided in FIGS. 12A and 12B for each of these data unit types. For unicast bridged frames, the ACA 26 provides the RFP 48 the outbound port number on which the frame is to be transmitted. For unicast routed frames, the ACA 26 provides the RFP 48 with the outbound port number for the frame, along with the outbound encapsulation type. ACA cache 28 search status (FIG. 12C), entry state (FIG. 12D), and QoS state (FIG. 12E) are also reported to the RFP 48 for use in making forwarding decisions. The frame processing decisions carried out by the RHP 46 also effect the data returned by the ACA 26 to the RHP 46 and the RFP 48 for further data unit processing.

The details of an ACA 26 which functions cooperatively with the presently disclosed RHP 46 are found in the commonly owned U.S. Patent Application entitled "A High Speed Cache Management Unit for Use in a Bridge/Router," filed on even date, and incorporated herein by reference.

In response to the ACA 26 data, for the unicast route case, the RHP 46 overwrites the original MAC DA with a new DA retrieved as part of the ACA cache 28 data. However, the original MAC DA is loaded into a register for forwarding to the RFP 48 (see FIGS. 4 and 5).

The RFP 48 is responsible for making forwarding decisions based on received data unit-characterizing information supplied by the RHP 46, the ACA 26, Port Control Registers (PCRs) 52, the RSM 40, the Receive Segmentation Unit ("RSEG") 50 and configuration information contained in configuration tables used by the RFP 48. More specifically, RFP 48 processing results in the generation of Transmit Vectors for data units being forwarded via hardware, Receive Vectors for data units being passed to the FP 30 for further processing in software, and Monitor Vectors for forwarding a copy of the received data unit to a monitor port for further software analysis. In this manner two separate frame processing paths are defined, namely, a high speed hardware forwarding path and a lower speed software forwarding path. The Transmit and Receive Vectors specify the port (s) on which the frame is to be forwarded, outbound data link encapsulation type (and thus an identification of the translation routine which must be executed by the THP 60) and other information needed for subsequent processing within the device 10. The RFP 48 is implemented primarily in hardware and is only partially programmable for error, monitoring and other special exception cases. The choice of forwarding path executed by the RFP 48 is effected in part by the routing versus bridging decisions made in the RHP 46 hardware, as well as by the identification in RHP hardware of received frame protocol for each candidate frame to be routed.

The details of an RFP 48 which functions cooperatively with the presently disclosed RHP 46 are found in the commonly owned U.S. Patent Application entitled "Use of Code Vectors for Port Control in a Bridge/Router," filed on even date, and incorporated herein by reference.

The RSEG 50 comprises a DMA controller which controls storage of received frame data within appropriate Buffer RAM 22 locations.

The transmit ASIC includes a Transmit Segment Unit (TSEG) 58, a plurality of Transmit Segment Unit (TSEG) FIFOs 59, a Transmit Header Processor (THP) 60, a Transmit State Machine ("TXSM") 62 and Transmit State Machine FIFOs 64. The TSEG 58 comprises a DMA controller which serves to move frame data segments from locations within the Buffer RAM 22 into an input FIFO designated as the TSEG FIFO 59, which comprises an input to the THP 60.

The THP 60 is responsible for performing data link header translations at hardware speeds for each forwarded frame presented to the THP 60. Upon completion of such translations, the THP 60 moves the translated header to an output FIFO designated as the Transmit State Machine (TXSM) FIFO 64. The THP 60 receives frames forwarded from the Buffer RAM 22 under the control of the TSEG 58 DMA controller. Combinatorial accelerator logic in the THP 60 receives as input signals layer-2 transmit encapsulation and layer-2 receive encapsulation identifiers from the RFP 46 via the MBA 32 and TSEG 58. The output of the combinatorial accelerator logic identifies the starting location of a translation routine which is based upon the layer-2 transmit encapsulation and layer-2 receive encapsulation.

For transparently bridged frames, only the data link headers are changed; the output encapsulation type is a function of inbound encapsulation type, output network media type and frame protocol type. For routed frames, the network layer headers are also changed and the output frame encapsulation type is explicitly defined per the routed protocol, per interface, i.e. the outbound frame encapsulation type is independent of the inbound frame encapsulation type. Additionally, for routed frames, the MAC SA of the outbound frame is overwritten to the MAC SA of the network bridge/router.

The THP 60 maintains network media specific data link translation tables which define unique translation program IDs for data link header changes. The THP 60 handles unicast and multicast bridging and routing via the execution of the unique translation programs specified by respective translation program IDs. The THP 60 always uses the inbound data link encapsulation type as an index into the appropriate data link translation routine. The THP 60 selects the appropriate data link translation table based upon the outbound data link encapsulation type. If the Route Flag is set in a Transmit Vector originated in the RFP 48, the THP 60 uses the protocol ID to select a translation routine specific to the routed protocol identified by the protocol ID. Thus, the translation function(s) to be carried out by the THP 60 is ultimately determined by the hardware-based frame header analysis performed by the RHP 46, including the identification by the RHP 46 of whether a received frame is a candidate for routing versus bridging, and if a routing candidate, which routing protocol is to be employed.

The details of a THP 60 which functions cooperatively with the presently disclosed RHP 46, and further discussion of the TSEG 58, TXSM 62 and associated structures noted herein, are found in the commonly owned U.S. Patent Application entitled "High Speed Header Translation Processing," filed on even date, and incorporated herein by reference.

Outbound frames are forwarded from the TXSM FIFO 64 over the respective output port 20 of the network interface module 14 for receipt by a downstream network device. The TXSM 62 receives frames from the THP 60 and is responsible for transmitting data units from the device 10 out of the respective output port 20. Following transmission, the TXSM 62 generates data unit transmit status information in statistics registers 66. Such status information includes error information, transmit frame and byte count information on a per port basis. Different versions of the TXSM are provided for different network interface module 14 types, i.e. Ethernet, FDDI and ATM.

These and other examples of the invention illustrated above are intended by way of example and the actual scope of the invention is to be limited solely by the scope and spirit of the following claims.

What is claimed is:

1. A network bridge/router for identifying a receive protocol of a received data unit and for routing said data unit according to said protocol, comprising:
   a header processor comprising
      register files for receiving a received data unit header,
      a control store of microcode,
      a microsequencer, associated with said register files and said control store, for identifying whether said data unit is to be routed, and if so which of a set of microcode routines stored in said control store is to be executed for said data unit, based upon identification of said receive protocol by said microsequencer of said received data unit header in said register files,
      a logical link control (LLC) table,
      a protocol type table, and
      a microcode jump table,
      wherein said microsequencer is further for:
         parsing said received data unit header in said register files based upon said received protocol to identify either a logical link control (LLC) value or a protocol type (TYPE) value associated with said received data unit,
         indexing a first of said LLC table and said protocol type table using said identified LLC or TYPE value, said indexed table for providing a protocol identifier associated with said received data unit,
         indexing, in said microcode jump table, said microcode routine to be executed for said data unit using said protocol identifier, and
         processing said received data unit according to said microcode routine.

2. The bridge/router of claim 1, wherein said header processor further comprises a data link address table in communication with said microsequencer for retaining an identification of a data link address range associated with said bridge/router, wherein said data unit is a candidate for routing if a data link destination address from said received data unit header in said register files, as compared by said microsequencer, is within said address range.

3. A method of routing a data unit through a network element at wire speed, comprising the steps of:
   receiving said data unit at a header processor;
   parsing said data unit, using a microsequencer executing microcode stored in a control store of said header processor, to establish a protocol of said received data unit and to determine if said received data unit is a candidate for routing through said network element;
   processing said received data unit header, by said microsequencer executing microcode stored in a protocol jump table within said header processor, based upon said received data unit protocol, for selectively forwarding data from said data unit header to an address cache management unit having an address cache associated therewith;
   indexing said address cache using said selectively forwarded data to return output configuration signals for said data unit;
   receiving further selectively forwarded data from said header processor and said address cache management unit at a frame processor for the creation of at least one processing vector specifying the output port through which said data unit is to be transmitted and an output data link encapsulation type for said data unit;
   performing data link header translations, by a translation processor, on said data unit based upon said at least one processing vector; and
   indexing translation tables, associated with said translation processor, with said at least one frame processor vector to index one of plural data link translation routines stored therein, and executing said indexed data link translation routine on said data unit to reconstruct said data unit in a format necessary for transmission from said network element.

4. A network bridge/router for identifying a receive protocol of a received data unit and for routing said data unit according to said protocol, comprising:

a header processor comprising
  register files for receiving a received data unit header,
  a control store of microcode,
  a microsequencer, associated with said register files and said control store, for identifying whether said data unit is to be routed, and if so which of a set of microcode routines stored in said control store is to be executed for said data unit, based upon identification of said receive protocol by said microsequencer of said received data unit header in said register files, and
  a flow filtering table in communication with said microsequencer;
an address cache management unit, having an associated cache; and
a frame processor,
wherein said address cache management unit, said frame processor and said header processor are each in communication with each other, said address cache management for receiving from said header processor:
  an indication of whether said received data unit is to be routed; and
  data unit address and received protocol signals, and
in response for providing to said header processor and said frame processor address, status, protocol signals, and output port information necessary to further process said data unit, and
wherein said microsequencer is for:
  indexing said flow filtering table using said protocol identifier and received data unit header data,
  for retrieving an indication of whether said received data unit should be handled as a reserved flow, and, if so, to identify a flow ID associated therewith to said address cache management unit.

5. The bridge/router of claim 4, wherein said address cache management unit further comprises a flow cache, and wherein said address management unit is for indexing said flow cache using said flow ID to identify transmission parameters associated with a respective flow to which said received data unit belongs.

6. The bridge/router of claim 4, said header processor further comprising a virtual local area network (VLAN) mapping table, wherein said microsequencer indexes said VLAN mapping table with a VLAN tag from said received data unit header in said register files to provide a VLAN ID to said address cache management unit and to said frame processor.

7. The bridge/router of claim 4, wherein said header processor is further for updating address data for said received data unit header in said register files based upon input from said address cache management unit.

8. The bridge/router of claim 4, wherein said frame processor generates a vector for specifying the output port through which said data unit is to be transmitted and an output data link encapsulation type for said data unit.

9. The bridge/router of claim 8, further comprising a translation processor in communication with said frame processor for performing data link header translations on said data unit based upon said frame processor vector.

10. The bridge/router of claim 9, wherein said translation processor further comprises translation tables comprised of plural data link translation routines, said translation processor for indexing said translation tables with said frame processor vector and for executing said indexed data link translation routine on said data unit.

11. A network bridge/router for identifying a receive protocol of a received data unit and for routing said data unit according to said protocol, comprising:
  a header processor comprising
    register files for receiving a received data unit header,
    a control store of microcode,
    a microsequencer, associated with said register files and said control store, for identifying whether said data unit is to be routed, and if so which of a set of microcode routines stored in said control store is to be executed for said data unit, based upon identification of said receive protocol by said microsequencer of said received data unit header in said register files;
  an address cache management unit, having an associated cache;
  a frame processor; and
  a translation processor in communication with said frame processor and comprising translation tables comprised of plural data link translation routines,
  wherein said address cache management unit, said frame processor and said header processor are each in communication with each other, said address cache management unit for receiving from said header processor:
    an indication of whether said received data unit is to be routed; and
    data unit address and received protocol signals, and
  in response for providing to said header processor and said frame processor address, status, protocol signals, and output port information necessary to further process said data unit,
  wherein said frame processor generates a vector for specifying the output port through which said data unit is to be transmitted and an output data link encapsulation type for said data unit, and
  wherein said translation processor is for performing data link header translations on said data unit based upon said frame processor vector, for indexing said translation tables with said frame processor vector and for executing said indexed data link translation routine on said data unit.

* * * * *